(12) United States Patent
Marti et al.

(10) Patent No.: US 10,850,746 B2
(45) Date of Patent: Dec. 1, 2020

(54) COORDINATING DELIVERY OF NOTIFICATIONS TO THE DRIVER OF A VEHICLE TO REDUCE DISTRACTIONS

(71) Applicant: Harman International Industries, Incorporated, Stamford, CT (US)

(72) Inventors: Stefan Marti, Oakland, CA (US); Adam Boulanger, Palo Alto, CA (US); Joseph Verbeke, San Francisco, CA (US); Davide Di Censo, Sunnyvale, CA (US); Mirjana Spasojevic, Palo Alto, CA (US); Jaime Elliot Nahman, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/044,437

(22) Filed: Jul. 24, 2018

(65) Prior Publication Data
US 2020/0031365 A1    Jan. 30, 2020

(51) Int. Cl.
*B60W 50/14* (2020.01)
*B60W 40/09* (2012.01)
*G06K 9/00* (2006.01)
*H04W 68/00* (2009.01)
*H04L 12/58* (2006.01)
(Continued)

(52) U.S. Cl.
CPC ............ *B60W 50/14* (2013.01); *B60W 40/09* (2013.01); *G06K 9/00845* (2013.01); *H04L 51/26* (2013.01); *H04W 68/005* (2013.01); *B60W 2040/0872* (2013.01); *B60W 2050/0029* (2013.01); *B60W 2050/143* (2013.01); *B60W 2050/146* (2013.01); *B60W 2540/22* (2013.01)

(58) Field of Classification Search
None
See application file for complete search history.

(56) References Cited

U.S. PATENT DOCUMENTS

| 6,060,993 A | * | 5/2000 | Cohen | B60Q 1/50 340/425.5 |
| 6,580,973 B2 | * | 6/2003 | Leivian | B60R 16/0231 701/1 |

(Continued)

OTHER PUBLICATIONS

Extended European Search Report for application No. 19184402.6 dated Dec. 2, 2019.

(Continued)

*Primary Examiner* — Chico A Foxx
(74) *Attorney, Agent, or Firm* — Artegis Law Group, LLP

(57) ABSTRACT

A notification control system (NCS) is configured to coordinate the delivery of notifications issued from a set of devices to the driver of a vehicle. The NCS registers all interactive devices residing in a vehicle and causes those devices to conform to specific directives generated by the NCS. The NCS analyzes and predicts the cognitive and emotional load on the driver and also estimates the cognitive and emotional impact on the driver potentially caused by any incoming notifications. The NCS then coordinates the delivery of notifications to the driver in a manner that avoids overwhelming the cognitive and/or emotional capacity of the driver. Accordingly, the NCS may avoid situations where device notifications cause the driver to unsafely divert attention away from driving.

20 Claims, 8 Drawing Sheets

(51) Int. Cl.
 *B60W 40/08* (2012.01)
 *B60W 50/00* (2006.01)

(56) References Cited

U.S. PATENT DOCUMENTS

| | | | | |
|---|---|---|---|---|
| 7,292,152 | B2* | 11/2007 | Torkkola | G08B 21/06 |
| | | | | 340/576 |
| 9,055,509 | B2* | 6/2015 | Macek | H04L 51/043 |
| 9,055,905 | B2* | 6/2015 | Watkins | A61B 5/18 |
| 9,188,449 | B2* | 11/2015 | Biswal | G01C 21/26 |
| 9,608,952 | B2* | 3/2017 | Wan | H04W 4/025 |
| 9,767,373 | B2* | 9/2017 | Yang | G06K 9/00335 |
| 9,940,844 | B2* | 4/2018 | Gazzaley | A61B 5/162 |
| 10,196,071 | B1* | 2/2019 | Rowson | B60W 50/14 |
| 10,210,409 | B1* | 2/2019 | Migneco | G06K 9/00845 |
| 10,399,575 | B2 | 9/2019 | Spasojevic et al. | |
| 2002/0091473 | A1* | 7/2002 | Gardner | G07C 5/0816 |
| | | | | 701/32.7 |
| 2002/0120374 | A1* | 8/2002 | Douros | G07C 5/085 |
| | | | | 701/34.4 |
| 2002/0151297 | A1* | 10/2002 | Remboski | G07C 5/085 |
| | | | | 455/414.1 |
| 2004/0037236 | A1* | 2/2004 | Massey | A61B 5/18 |
| | | | | 370/277 |
| 2006/0287787 | A1* | 12/2006 | Engstrom | G08B 21/06 |
| | | | | 701/36 |
| 2008/0084287 | A1* | 4/2008 | Sturm | B60W 50/14 |
| | | | | 340/438 |
| 2008/0231703 | A1* | 9/2008 | Nagata | H04N 7/181 |
| | | | | 348/148 |
| 2009/0298482 | A1* | 12/2009 | Yen | H04M 1/6075 |
| | | | | 455/414.2 |
| 2010/0007479 | A1* | 1/2010 | Smith | B60K 28/066 |
| | | | | 340/436 |
| 2011/0143726 | A1* | 6/2011 | de Silva | H04M 1/72569 |
| | | | | 455/414.1 |
| 2012/0235819 | A1* | 9/2012 | Watkins | A61B 5/18 |
| | | | | 340/573.1 |
| 2013/0054090 | A1* | 2/2013 | Shin | B60K 28/06 |
| | | | | 701/36 |
| 2013/0165165 | A1* | 6/2013 | Macek | H04W 48/04 |
| | | | | 455/466 |
| 2013/0335213 | A1* | 12/2013 | Sherony | G08G 1/167 |
| | | | | 340/439 |
| 2014/0007010 | A1* | 1/2014 | Blom | G06F 3/0481 |
| | | | | 715/825 |
| 2014/0303842 | A1* | 10/2014 | Boelter | B60K 35/00 |
| | | | | 701/36 |
| 2014/0370870 | A1* | 12/2014 | Mankowski | H04W 4/48 |
| | | | | 455/418 |
| 2015/0098609 | A1* | 4/2015 | Sarratt | G06K 9/00369 |
| | | | | 382/103 |
| 2015/0160019 | A1* | 6/2015 | Biswal | B60W 50/00 |
| | | | | 701/1 |
| 2015/0197205 | A1* | 7/2015 | Xiong | B60R 16/037 |
| | | | | 701/49 |
| 2015/0266377 | A1* | 9/2015 | Hampiholi | H04M 1/72552 |
| | | | | 455/466 |
| 2015/0331238 | A1* | 11/2015 | Roth | B60K 37/00 |
| | | | | 348/115 |
| 2015/0358456 | A1 | 12/2015 | Prakah-Asante et al. | |
| 2015/0367770 | A1* | 12/2015 | Newton-Dunn | B60Q 1/00 |
| | | | | 340/438 |
| 2016/0147563 | A1* | 5/2016 | Prakah-Asante | G06F 9/546 |
| | | | | 719/314 |
| 2016/0152240 | A1 | 6/2016 | Newton-Dunn et al. | |
| 2016/0163217 | A1* | 6/2016 | Harkness | G09B 9/052 |
| | | | | 434/65 |
| 2016/0183068 | A1* | 6/2016 | Shen | G06Q 10/109 |
| | | | | 455/466 |
| 2017/0011640 | A1* | 1/2017 | Rebolledo-Mendez | |
| | | | | G09B 5/00 |
| 2017/0190337 | A1* | 7/2017 | Singh | B60W 50/14 |
| 2018/0009442 | A1 | 1/2018 | Spasojevic et al. | |
| 2018/0059798 | A1 | 3/2018 | Matsubara et al. | |
| 2018/0248746 | A1* | 8/2018 | Deluca | H04L 67/22 |
| 2018/0348723 | A1* | 12/2018 | Brew | G06F 40/216 |
| 2019/0008437 | A1* | 1/2019 | Ben-Ezra | B60W 50/14 |
| 2019/0034157 | A1* | 1/2019 | Steinberg | G06F 3/167 |
| 2019/0061772 | A1* | 2/2019 | Prinz | A61B 5/18 |
| 2019/0065873 | A1* | 2/2019 | Wang | G06K 9/00845 |
| 2019/0135177 | A1* | 5/2019 | Farrell | B60Q 9/00 |
| 2019/0163331 | A1* | 5/2019 | Epperlein | G06F 3/0481 |
| 2019/0185014 | A1* | 6/2019 | Choo | G05D 1/0061 |
| 2019/0215290 | A1* | 7/2019 | Kozloski | H04L 51/24 |
| 2019/0311241 | A1* | 10/2019 | Friedman | G06N 5/04 |

OTHER PUBLICATIONS

Park, I.P., "Harman CTO discusses cutting edge HMI design", URL: https://www.sae.org/news/2015/10/harman-cto-discusses-cutting-edge-hmi-design, Oct. 22, 2015, 3 pages.

Nakamura, Yusuke, "Driver Workload Management based on GENIVI Driver Workload Assessor", URL: https://events17.linuxfoundation.org/sites/events/files/slides/Driver%20Workload%20Management%20based%20on%20GENIVI%20Driver%20Workload%20Assessor.pdf, Jul. 2014, 28 pages.

Marx et al., "Clues: Dynamic Personalized Message Filtering", URL:http://dl.acm.org/citation.cfm?id=240230, Proceedings of CSCW '96, 1996, pp. 113-121.

* cited by examiner

COORDINATING DELIVERY OF NOTIFICATIONS TO THE DRIVER OF A VEHICLE TO REDUCE DISTRACTIONS

BACKGROUND

Field of the Various Embodiments

The various embodiments relate generally to automobiles, and more specifically to coordinating delivery of notifications to the driver of a vehicle to reduce distractions.

Description of the Related Art

Modern vehicles commonly include multiple devices that occupants of a vehicle can interact with to perform various functions. For example, and without limitation, a vehicle could include an interactive navigation system with which a vehicle occupant could obtain driving instructions. Such systems may be display based (center console display, display cluster, head-up display (HUD)), and have other components (haptics, remote haptics, shape-shifting controllers such as shape-shifting rotary knobs and shape-shifting steering wheels). The vehicle could also include an interactive stereo system with which a vehicle occupant could play music. In addition, occupants of vehicles may bring portable and wearable interactive devices into vehicles. For example, and without limitation, a vehicle occupant could bring a mobile phone, a tablet computer, a portable video game console, a smart phone, a head-mounted display device (for notifications and augmented reality content), smart glasses, and other devices with which the occupant could interact.

Each of these different devices may be configured to generate notifications that may require interaction from vehicle occupants or otherwise cause those occupants to divert attention. For example, and without limitation, the mobile phone mentioned above could ring, indicating that an incoming call should be answered. Alternatively, the interactive navigation system noted above could generate a visual and/or auditory notification indicating that a selection of a driving route is needed. As a general matter, any interactive device that is integrated with or brought into a vehicle may produce one or more types of notification at any given time. These notifications pose specific problems to the driver of the vehicle.

In particular, such notifications can be distracting to the driver of the vehicle and may cause the driver to divert attention away from driving. For example, and without limitation, if a mobile phone within the vehicle rings, the driver could be compelled to divert attention away from driving in order to answer the call. This problem is worsened when multiple devices generate notifications simultaneously. For example, and without limitation, if the driver's mobile phone rings at the same time that the navigation system requests that a route be selected, then the driver may become overwhelmed with input and then pay an insufficient amount of attention to driving. The above-described problem may also be worsened if one or more devices generate notifications during a period of time during which the driver needs to focus an elevated level of attention on the act of driving. For example, and without limitation, if the driver's tablet computer generates a notification while the driver is attempting to merge into traffic, the driver may not be able to coordinate the merge operation safely due to the distracting notification. Situations such as these are exceedingly problematic because distracted driving is recognized as one of the leading causes of vehicle accidents.

As the foregoing illustrates, more effective techniques for mitigating distractions associated with device notifications within a vehicle would be useful.

SUMMARY

One or more embodiments set forth a computer-implemented method for transmitting notifications to a driver of a vehicle, including determining a first mental load on the driver based on sensor data, determining a second mental load on the driver associated with a first notification, determining, based on the first mental load and the second mental load, that a mental load threshold will be exceeded, modifying at least one characteristic of the first notification to generate a modified notification, and transmitting the modified notification to one or more output devices, wherein the one or more output devices output the modified notification within the vehicle.

One advantage of the approach described above is that the driver of the vehicle may maintain sufficient cognitive and mental resources to safely operate the vehicle. Accordingly, the techniques described herein represent a technological advancement over conventional systems that do not coordinate the delivery of notifications.

BRIEF DESCRIPTION OF THE SEVERAL VIEWS OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

As discussed above, devices within a vehicle can generate notifications at unpredictable times, thereby leading to situations in which the driver of the vehicle can become distracted. This situation is especially problematic when multiple notifications arrive simultaneously and/or when one or more notifications arrive during periods of time when the driver needs to focus an elevated level of attention on the act of driving. As a general matter, because in-vehicle devices generate notifications unpredictably and independently of context, those devices may distract a driver of a vehicle and/or the vehicle occupants.

To address these issues, embodiments of the invention include a notification control system (NCS) configured to coordinate the delivery of notifications issued from a set of devices to the driver of a vehicle. The NCS registers all interactive devices residing in a vehicle and causes those devices to conform to specific directives generated by the NCS. The NCS analyzes and predicts the cognitive and emotional load on the driver and also estimates the cognitive and emotional impact on the driver potentially caused by any incoming notifications. The NCS then coordinates the delivery of notifications to the driver in a manner that avoids overwhelming the cognitive and/or emotional capacity of the driver. The NCS may suppress notifications, delay the delivery of notifications, and/or transcode notifications into other media associated with different sensory modalities. The NCS may perform these operations in real-time based on the cognitive and emotional state of the driver and/or based on the current and predicted driving context.

One advantage of the approach described above is that the driver of the vehicle may be afforded sufficient cognitive and mental resources to safely operate the vehicle. Because the NCS coordinates the delivery of notifications based upon the state of the driver and also the driving context, the NCS avoids situations where device notifications cause the driver to unsafely divert attention away from driving. Accordingly, the techniques described herein represent a technological advancement over conventional systems that do not coordinate the delivery of notifications.

System Overview

Figure 1:
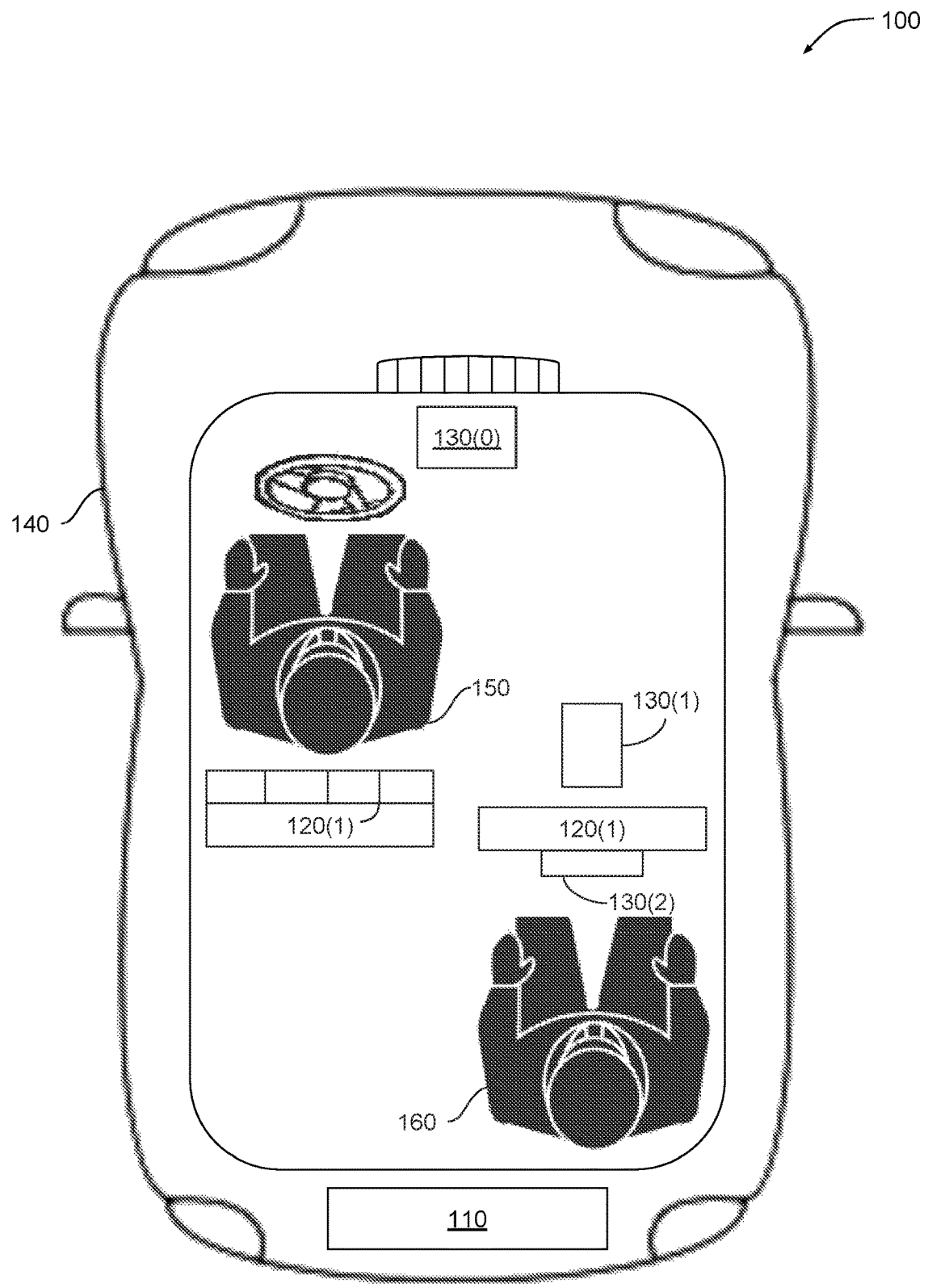
FIG. 1 illustrates a notification control system configured to implement one or more aspects of the various embodiments.

FIG. 1 illustrates a notification control system configured to implement one or more aspects of the various embodiments. As shown, a notification control system (NCS) 100 includes a computing device 110 and sensor arrays 120. Computing device 110 is configured to couple with various interactive devices 130 that reside within a vehicle 140. Vehicle 140 transports occupants, including driver 150 and passenger 160. Vehicle 140 may include a car, truck, construction machine and/or heavy machinery, motorcycle, boat, submarine, jet ski, snowmobile, airplane, spaceship, exoskeleton, and a power loader, among others. Sensors 120 are configured to measure data that reflects a plurality of different physiological attributes of driver 150.

Computing device 110 implements a discovery process to establish communications with interactive devices 130 and assume control over when and how those devices output notifications to driver 150. Computing device 110 also processes data gathered via sensors 120 to determine the cognitive and/or emotional load on driver 150 at any given time. Computing device 110 then analyzes notifications to be scheduled for delivery and estimates the cognitive and/or emotional impact of those notifications on driver 150. Finally, computing device 110 coordinates the delivery of notifications to driver 150 to avoid causing driver 150 excessive mental load, as described in greater detail below in conjunction with FIGS. 2A-2C.

Figure 2A:
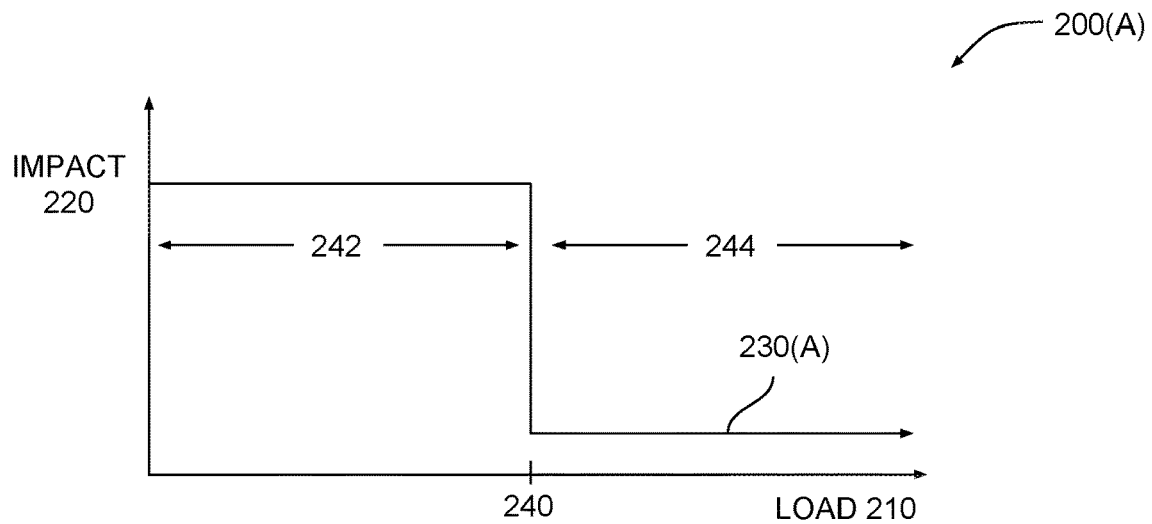
FIGS. 2A-2C illustrate various graphs depicting how device notifications may be throttled in response to mental load, according to various embodiments.
Figure 2B:
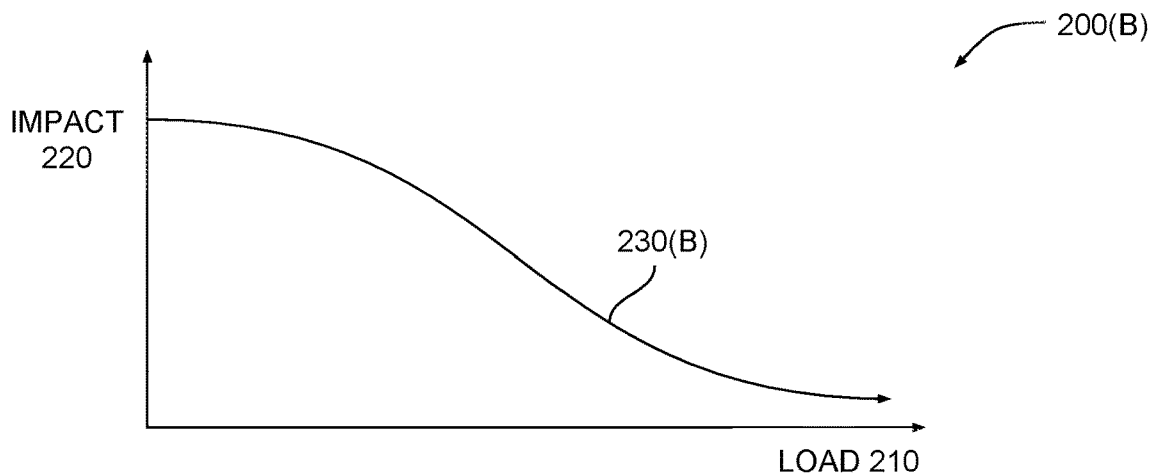
Figure 2C:
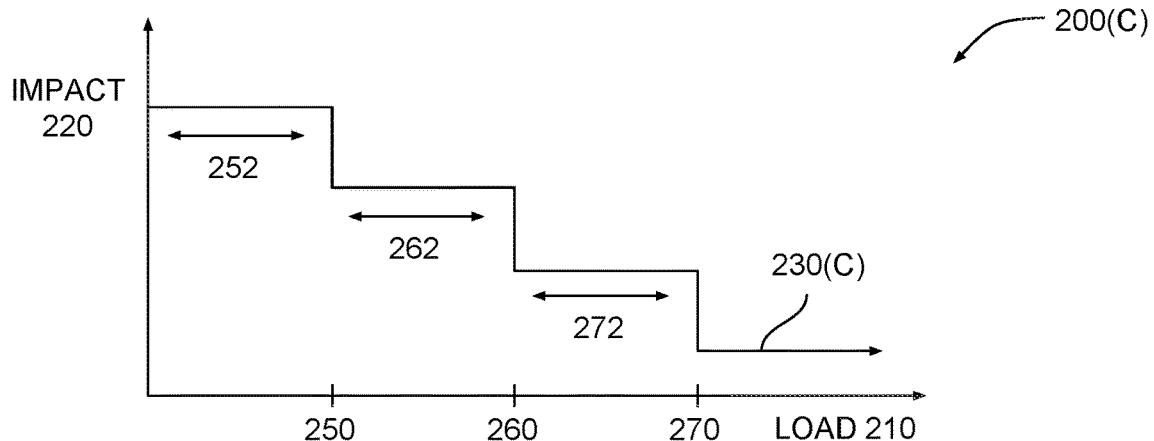

FIGS. 2A-2C illustrate various graphs depicting how device notifications may be throttled in response to mental load, according to various embodiments. As shown in each of these Figures, a graph 200 includes load axis 210 and impact axis 220. Load axis 210 corresponds to the mental load of driver 150 at any given time. Impact axis 220 corresponds to the predicted additional cognitive/emotional load driver may potentially experience in response to a given notification. As a general matter, in the context of this disclosure, the term "impact" refers to additional mental load caused by sensory input driver 150 receives. Plot 230 indicates the maximum allowed impact of a given notification output to driver 150 as a function of the mental load on driver 150.

As shown in FIG. 2A, graph 200(A) includes plot 230(A) plotted against load axis 210 and impact axis 220. According to plot 230(A), when mental load is low, as in region 242, higher impact notifications can be output to driver 150. Conversely, when mental load is high, as in region 244, only lower impact notifications can be output to driver 150. Region 242 may correspond to driving contexts that do not require elevated attention from driver 150. For example, and without limitation, region 242 may correspond to driving along a straight country road with little traffic. Region 244, on the other hand, may correspond to driving contexts that do require elevated attention from driver 150. For example, and without limitation, region 244 may correspond to driving in heavy traffic during rush hour after a long day at the office. According to graph 200(A), notifications having higher impact levels can be output to driver 150 until the mental load on driver 150 reaches threshold 240, after which only lower impact notifications can be output. FIGS. 2B-2C illustrate other ways notifications can be throttled.

As shown in FIG. 2B, graph 200(B) includes plot 230(B) plotted against load axis 210 and impact axis 220. According to plot 230(B), the maximum impact level of notifications that can be output to driver 150 gradually decreases as the mental load on driver 150 increases. With this approach, the maximum impact level of any notification to be output to driver 150 is approximately and/or indirectly proportional to the current mental load of driver 150.

As shown in FIG. 2C, graph 200(C) includes plot 230(C) plotted against load axis 210 and impact axis 220. Plot 230(C) includes regions 252, 262, and 272 corresponding to low, medium, and high mental load. Plot 230(C) may also include other regions as well. When the mental load on driver 150 falls within any given region, only notifications having less than or equal to the corresponding maximum impact level can be output to driver 150.

Referring generally to FIGS. 2A-2C, NCS 100 may buffer notifications with predicted impact exceeding the current maximum impact for later delivery. Additionally or alternatively, NCS 100 may transcode those notifications into a different delivery mechanism that may be less distracting to driver 150. These particular techniques are described in greater detail below in conjunction with FIGS. 5A-6C.

With the above approach, NCS 100 coordinates notifications output by interactive devices 130 in a manner that avoids consuming excessive attention from driver 150. Thus, NCS 100 may avoid situations where driver 150 is distracted from driving by incoming device notifications. Various hardware and software configured to implement the above techniques are described in greater detail below in conjunction with FIGS. 3-4.

Hardware Overview

Figure 3:
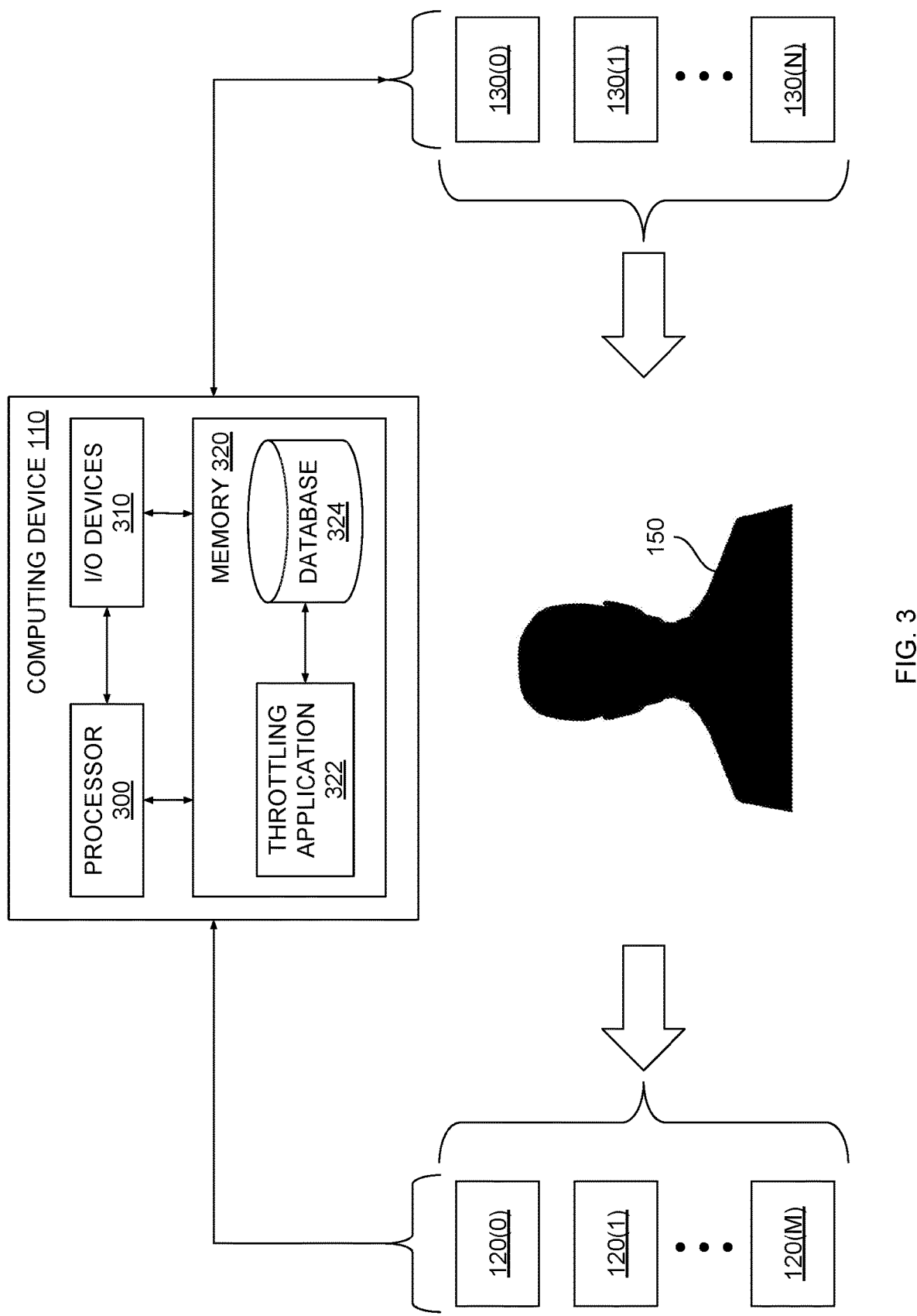
FIG. 3 is a more detailed illustration of the computing device of FIG. 1, according to various embodiments.

FIG. 3 is a more detailed illustration of the computing device of FIG. 1, according to various embodiments. As shown, computing device 110 includes processor 300, input/output (I/O) devices 310, and memory 320, and is coupled to sensor arrays 120 and interactive devices 130.

Processor 300 includes any technically feasible set of hardware units configured to process data and execute software applications. For example, and without limitation, processor 300 could include one or more of a central processing unit (CPU), a graphics processing unit (GPU), and an application specific integrated circuit (ASICs). I/O devices 310 include any technically feasible set of devices configured to perform input and/or output operations, including, for example, and without limitation, a display device, a keyboard, a mouse, a touchscreen, a loudspeaker, haptic actuators, mid-air haptic transducers, and shape-shifting interfaces, among others. Memory 320 includes any technically feasible set of storage media configured to store data and software applications, such as a hard disk, a random-access memory (RAM) module, and a read-only memory (ROM), for example. Memory 320 includes a throttling application 322 and a database 324. Throttling application 322 includes program code that, when executed by processor 300, analyzes data captured by sensor arrays 120 to determine the mental load on driver 150 at any given time.

Sensor arrays 120 may include pupil sensors, heart rate sensors, breathing rate sensors, galvanic skin response sensors, optical devices configured for facial recognition, neural activity sensors, audio sensors, muscle contraction sensors, eye gaze detectors, voice analyzers, gesture sensors, radar sensors, thermal sensors, and any other technically feasible type of sensor configured to measure any attribute of a human being. Sensor arrays 120 may also include gesture detectors, touch detectors, kinematic and/or dynamic sensors for measuring the dynamics of vehicle 140, state sensors for determining the mechanical state of vehicle 140, and environmental sensors for detecting the ambient conditions inside and outside of vehicle 140. Sensor arrays 120 may further include devices configured to gather information from third party services that may provide weather, traffic, and road condition data, among other types of data. Sensor arrays 120 may also include outward-facing sensors configured to collect information associated with the environment surrounding vehicle 140, including geolocation sensors, range sensors, daylight sensors, and so forth.

Based on data captured via sensor arrays 120, throttling application 322 determines the current cognitive and/or emotional load on driver 150. Throttling application 322 may also predict the cognitive/emotional load on driver 150 at any future time based on contextual data, such as driving conditions, weather conditions, road conditions, among other examples and without limitation. Throttling application 322 also discovers and registers interactive devices 130 and assumes control over notifications output by those devices. Throttling application 322 may implement a cognitive and/or emotional model of driver 150 in order to predict the cognitive and/or emotional impact of a given notification on driver 150. Throttling application 322 then coordinates the delivery of notifications to driver 150 to prevent the cognitive and/or emotional load on driver 150 from exceeding a maximum level. Various modules within throttling application 322 responsible for performing these operations are described in greater detail below in conjunction with FIG. 4.

Software Overview

Figure 4:
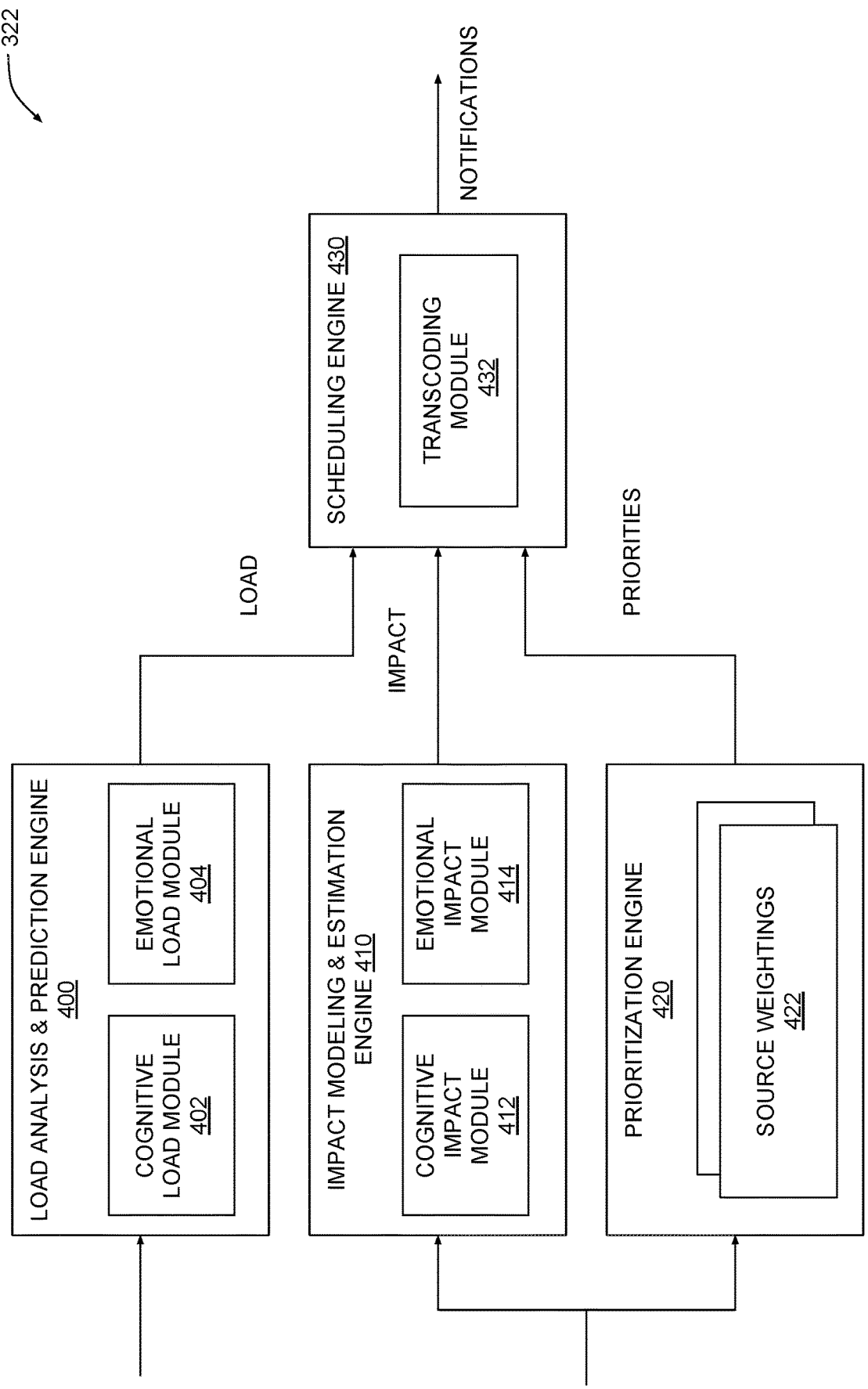
FIG. 4 is a more detailed illustration of the throttling application of FIG. 3, according to various embodiments.

FIG. 4 is a more detailed illustration of the throttling application of FIG. 3, according to various embodiments. As shown, throttling application 322 includes load analysis and prediction engine 400, impact modeling and estimation engine 410, prioritization engine 420, and scheduling engine 430.

Load analysis and prediction engine 400 includes cognitive load module 402 and emotional load module 404. Cognitive load module 402 analyzes data captured from sensor arrays 120 to determine the cognitive load on driver 150. Cognitive load module 402 may include a machine learning (ML) model of driver 150 that is updated based on the cognitive responses of driver 150 to various types of events, including, for example and without limitation, notifications generated by interactive devices 130 as well as various driving-related events. The ML model may initially include a baseline model that is generated based on analyzing the responses of a plurality of other drivers of other vehicles. That baseline model can be fine-tuned over time to better approximate the cognitive load of driver 150 based on sensor data.

Emotional load module 404 analyzes data captured from sensor arrays 120 to determine the emotional load on driver 150. Similar to cognitive load module 402, emotional load module 404 may include an ML model of driver 150 that is updated based on the emotional responses of driver 152 to various types of events, including, for example and without limitation, notifications and other events. This ML model may initially include a baseline model that is generated based on analyzing the emotional responses of other drivers. The baseline model can be fine-tuned over time to better approximate the emotional load of driver 150 given various sensor readings. Load analysis and prediction engine 400 synthesizes the determined cognitive load and emotional load of driver 150 to generate a combined load metric, referred to herein as "mental load" or simply "load." Load analysis and extension 400 outputs this load metric to scheduling engine 430.

In parallel with the operation of load analysis and prediction engine 400, impact modeling and estimation engine 410 analyzes notifications associated with interactive devices 130 in order to estimate the cognitive and/or emotional impact of those notifications on driver 150. Impact modeling and estimation engine 410 includes a cognitive impact module 412 and an emotional impact module 414. Cognitive impact module 412 is configured to predict the cognitive impact on driver 150 of any given notification. Cognitive impact module 412 may include an ML model of driver 150 that, in some embodiments, is derived from the ML model included in cognitive load module 402 and trained in like fashion. Similarly, emotional impact module 414 is configured to predict the emotional impact on driver 150 of any given notification. Emotional impact module 414 may include an ML model of driver 150 that, in some embodiments, is derived from the ML model included in emotional load module 404 and trained in like fashion. Impact modeling and estimation engine 410 synthesizes the predicted cognitive and emotional impact of any given notification on driver 150 to generate an impact metric. Impact modeling and estimation engine 410 outputs this impact metric to scheduling engine 430.

In parallel with the above-described engines, prioritization engine 420 analyzes received notifications using a set of source weightings 422. Each source weighting 422 indicates a priority associated with a particular source from which a notification may be received. For example, and without limitation, a given source weighting 422 could indicate that email messages received from the spouse of driver 150 should take priority over email messages received from the boss of driver 150. In another example, and without limitation, a given source weighting 422 could indicate that vehicle notifications associated with driving should take priority over all other notifications. Prioritization engine 420 assigns priorities to different notifications and outputs these priorities to scheduling engine 430.

Scheduling engine 430 analyzes the current load on driver 150, the predicted impact of received notifications on driver 150, and the priorities assigned to those notifications, and then coordinates the delivery of notifications to driver 150 in a manner that avoids causing the cognitive and/or emotional load of driver 150 to exceed a maximum level. For example, and without limitation, scheduling engine 430 could identify that the load on driver 150 is elevated, and then determine that a given notification should be delayed because that notification could potentially cause the load on driver to exceed a maximum level. In addition, scheduling engine 430 may implement transcoding module 432 to transcode a high priority notification into a different medium that allows more immediate delivery to driver 150. For example, and without limitation, scheduling engine 430 could identify that a text message was received from the spouse of driver. Then, scheduling engine 430 could determine that although driver 150 is visually engaged with driving, the text message can be transcoded into speech and delivered to driver 150 audibly without causing driver 150 any visual distractions. FIGS. 5A-6C set forth more detailed examples of how scheduling engine 430 schedules notifications for delivery.

Coordination of Exemplary Notifications

Figure 5A:
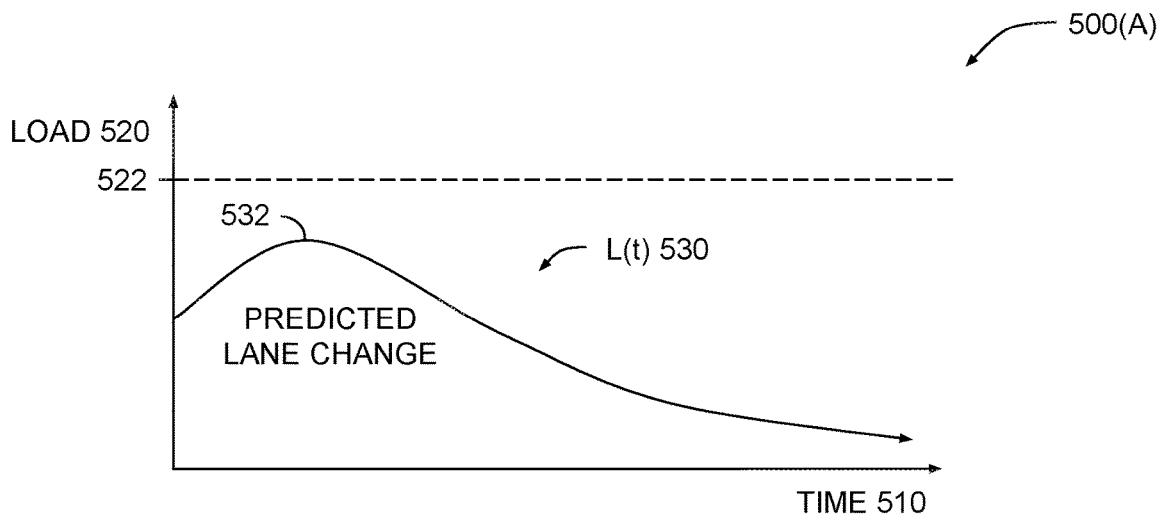
FIGS. 5A-5C illustrate examples of how the notification control system of FIG. 1 may coordinate delivery of multiple notifications to the driver of a vehicle, according to various embodiments.
Figure 5B:
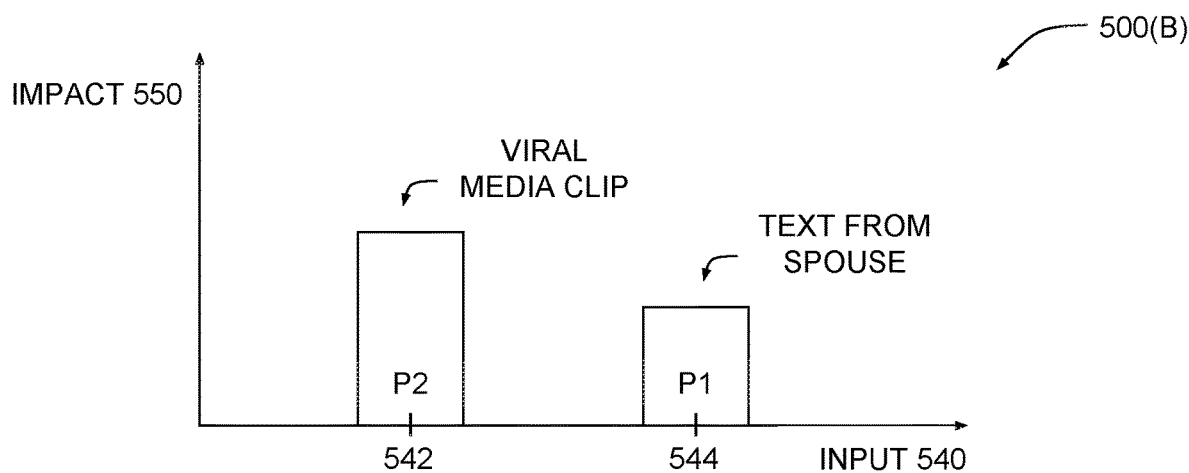
Figure 5C:
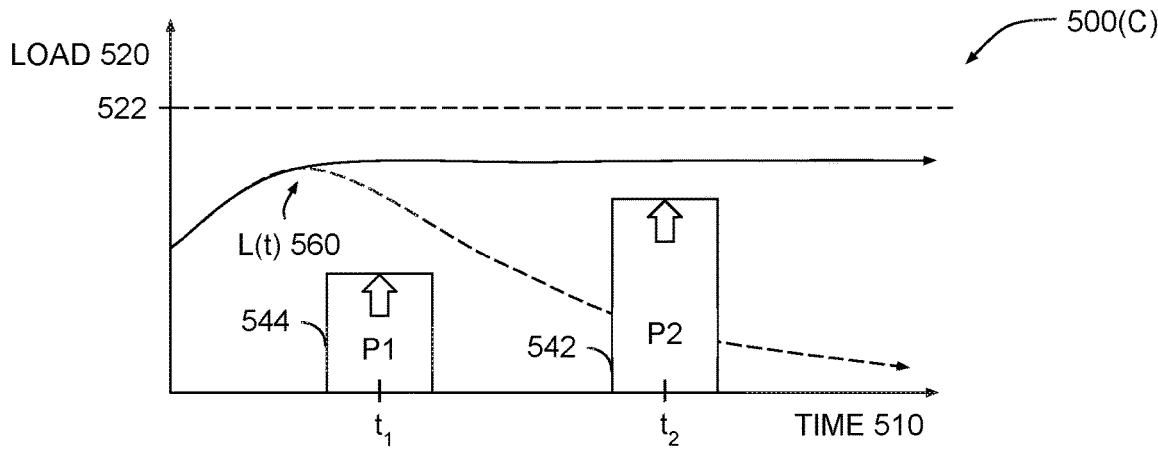

FIGS. 5A-5C illustrate examples of how the notification control system of FIG. 1 coordinates delivery of multiple notifications to the driver of a vehicle, according to various embodiments.

As shown in FIG. 5A, a graph 500(A) includes time axis 510 and load axis 520. A function, L(t) 530, is plotted against time axis 510 and load axis 520. L(t) 530 represents the load of driver 150 over time. A portion of L(t) 530 is determined based on the real-time, current load computed based on sensor readings. Another portion of L(t) 530 is estimated based on contextual information, including traffic data, driving data, weather information, road conditions, and so forth. For example, and without limitation, peak 532 of L(t) 530 corresponds to a predicted lane change. Generally, L(t) 530 represents the load of driver 150 within a time window starting with the current time. In addition, maximum load 522 represents the maximum allowable load that driver 150 should experience at any time. As described below, NCS 100 coordinates the delivery of notifications to driver 150 to keep driver load beneath maximum load 522.

As shown in FIG. 5B, graph 500(B) includes input axis 540 and impact axis 550. Notifications 542 and 544 are displayed along input axis 540. These notifications may be received via interactive devices 130 and then transmitted to NCS 100 for delivery to driver 150. Notification 542 corresponds to a viral media clip, while notification 544 corresponds to a text message from the spouse of driver 150. NCS 100 analyzes these notifications and determines that notification 542 will likely have a high impact on the load of driver 150 and therefore may be distracting. NCS 100 also determines that notification 544 may have a lower impact on driver 150 and therefore be less distracting. NCS 100 generally makes these predictions using the various models discussed above in conjunction with FIG. 4. In addition, NCS 100 also determines that notification 544 has a higher priority than notification 542 based on the source of those notifications using the techniques described above in conjunction with FIG. 4. Based on the priority and estimated impact associated with the different notifications, NCS 100 schedules those notifications for delivery to driver 150 in a manner that does not cause the load of driver 150 to exceed maximum load 522.

As shown in FIG. 5C, NCS 100 schedules notification 544 to be delivered to driver 150 at time $t_1$ and schedules notification 542 to be delivered to driver 150 at time $t_2$. Both of these notifications increase the load on driver 150. However, notification 544 only increases the load by a small amount, notification 542 increases the load by larger amount, and over time neither notification causes the load on driver 150 to exceed the maximum load 522. In addition, because NCS 100 distributes the delivery of notifications across time, driver 150 can process those notifications separately and therefore may not become overloaded. NCS 100 also transcodes notifications into different media to expedite the delivery of certain notifications while avoiding exceeding the maximum load of driver 150, as described in greater detail below in conjunction with FIGS. 6A-6C.

Figure 6A:
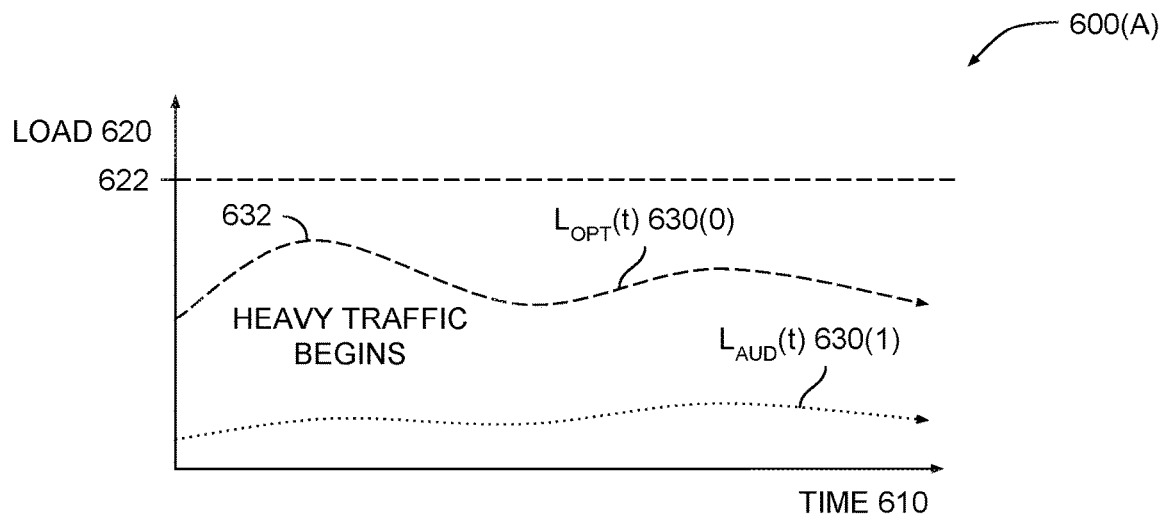
FIGS. 6A-6C illustrate examples of how the notification control system of FIG. 1 may transcode notifications between sensory modalities, according to various embodiments.
Figure 6B:
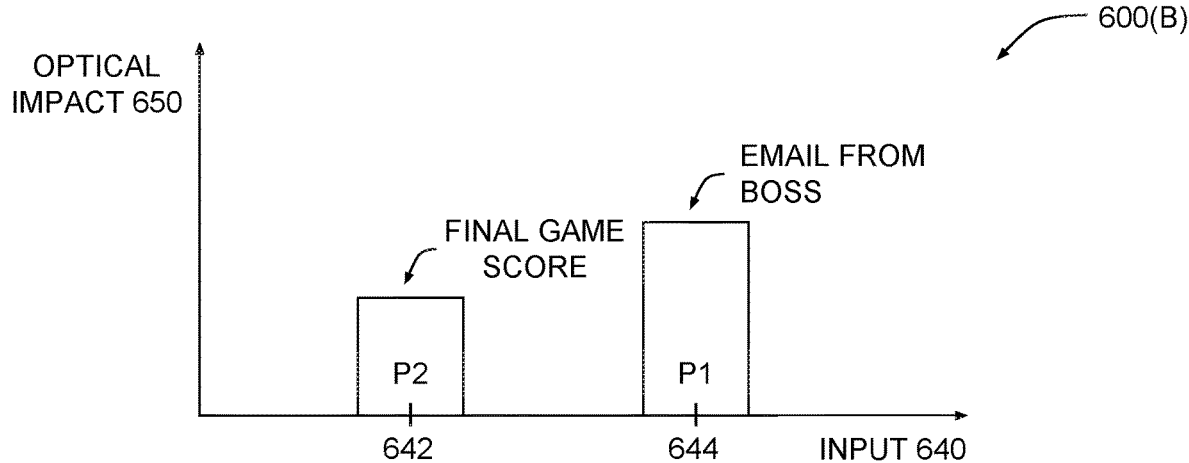
Figure 6C:
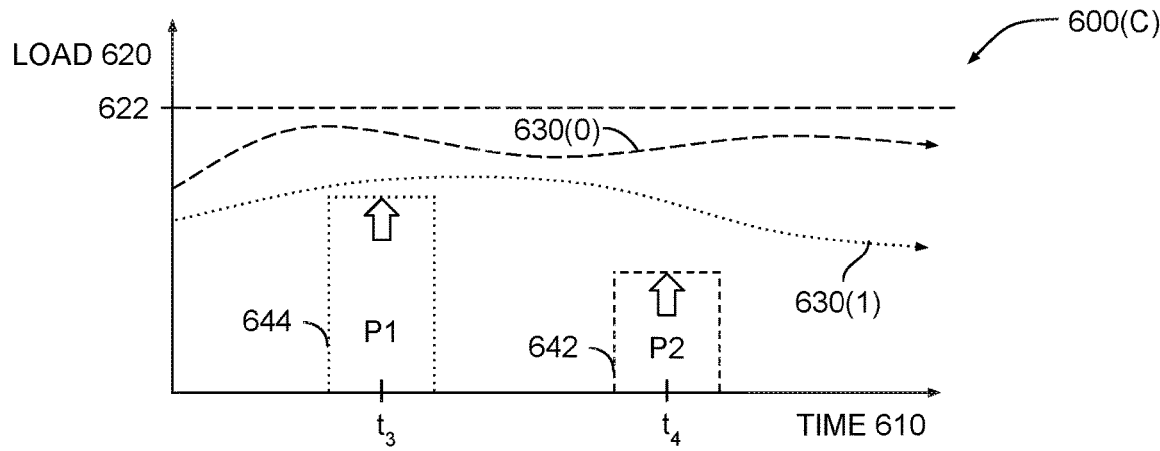

FIGS. 6A-6C illustrate examples of how the notification control system of FIG. 1 transcodes notifications between sensory modalities, according to various embodiments. As shown in FIG. 6A, a graph 600(A) includes time axis 610 and load axis 620. Two functions 630 are plotted against time axis 610 and load axis 620. $L_{opt}(t)$ 630(0) represents the load of driver 150 over time caused by optical inputs, which may include visual inputs falling within the visual range of humans as well as other optical transmissions. $L_{aud}(t)$ 630(1) represents the load of driver 150 over time caused by auditory inputs. NCS 100 may determine $L_{opt}(t)$ 630(0) and $L_{aud}(t)$ 630(1) by analyzing sensor data associated with driver 150, analyzing information associated with vehicle 140, and analyzing contextual information related to driving, among others. For example, and without limitation, NCS 100 could analyze real-time driving information and determine that driver 150 is currently engaged with navigating heavy traffic. As is shown, heavy traffic begins at peak 632. NCS 100 could then compute $L_{opt}(t)$ 630(0) to indicate that the optical load on driver 150 is elevated. In another example, and without limitation, NCS 100 could analyze sensor data indicating that the interior cabin of vehicle 140 is relatively quiet. NCS 100 could then compute $L_{aud}(t)$ 630(1) to indicate that the auditory load on driver 150 is minimal, as is shown. The overall load on driver 150 at any given time may be derived from the individual loadings associated with each different sensory modality. Based on real-time estimates and predictions of $L_{opt}(t)$ 630(0) and $L_{aud}(t)$ 630(1) computed in the manner described above, NCS 100 transcodes notifications between sensory modalities to prevent the overall load on driver 150 from exceeding maximum load 622.

As shown in FIG. 6B, graph 600(B) includes input axis 640 and impact axis 650. Notifications 642 and 644 are displayed along input axis 640. These notifications may be received via interactive devices 130 and then transmitted to NCS 100 for delivery to driver 150. Notification 642 corresponds to an email sent by the boss of driver 150, while notification 644 corresponds to an indication of the final score of a sporting event (potentially received via a sports app). NCS 100 analyzes the content of these notifications and then estimates the predicted impact on driver 150. In doing so, NCS 100 determines that each of these notifications includes optical content, and therefore may demand an elevated level of optical processing to be performed by driver 150. NCS 100 also prioritizes notifications 642 and 644 and determines that notification 642 is low priority and can be delayed, while notification 644 is higher priority and should be delivered expeditiously. However, because the optical load on driver 150 is already elevated, NCS 100 determines that notification 642 cannot be delivered to driver 150 optically and should instead be transcoded into an auditory format.

As shown in FIG. 6C, NCS 100 transcodes notification 644 into an auditory medium, such as spoken and/or dictated text, for example and without limitation, and then schedules notification 644 to be delivered to driver 150 at time $t_3$. Because notification 644 does not demand driver 150 to perform optical processing, $L_{opt}(t)$ 630(0) is not significantly increased and therefore the load on driver 150 does not exceed maximum load 622. $L_{aud}(t)$ 630(1) is elevated, but similarly does not cause the load of driver 150 to surpass maximum load 622. NCS 100 also schedules notification 642 to be delivered to driver 150 at time $t_4$. NCS 100 need not transcode notification 642 into an auditory format because at time $t_4$ $L_{opt}(t)$ 630(0) decreases sufficiently that driver 150 can spare optical processing resources. However, NCS 100 may optionally transcode notification 642 anyway in order to allow $L_{opt}(t)$ 630(0) to decrease to a lower level. Although the example described in conjunction with these figures pertains to just two sensory modalities, NCS 100 may select between any number of sensory modalities when transcoding notifications.

In one embodiment, NCS 100 may also transcode notifications during delivery if the measured mental load on driver 150 begins increasing beyond expected or acceptable levels. In addition, NCS 100 may transcode and summarize notifications for quick delivery, and then deliver the original notification at a later time in the original sensory modality.

Referring generally to FIGS. 5A-6C, NCS 100 coordinates the delivery of notifications, potentially transcoding those notifications between sensory modalities, in order to control the cognitive and/or emotional load placed on driver 150 and keep that load below a maximum level. Importantly, this approach reduces potential distractions while still allowing driver 150 to receive important information delivered via notifications. Although the techniques described above are discussed relative to driving, persons skilled in the art will understand that these techniques can be applied to control any source of distraction that can interfere with any human activity.

In one embodiment, NCS 100 analyzes the behavior of driver 150 and then determines a degree to which driver 150 is focused on driving. If the degree of focus indicates that driver 150 is not sufficiently focused on driving, then NCS 100 may suppress all notifications and instruct driver 150 to pay more attention to driving. If the degree of focus indicates that driver 150 is focused on driving but can spare cognitive and/or emotional resources, then NCS 100 may schedule notifications in the manner described above. If the degree of focus indicates that driver 150 is focused on driving and cannot spare cognitive and/or emotional resources, then NCS 100 may delay or transcode notifications as also described above. In this manner, NCS 100 helps keep the attention level of driver 150 within a "sweet spot" that may facilitate safe driving.

In another embodiment, NCS 100 relies on cloud-based data to update and/or generate machine learning models used to predict the cognitive and/or emotional load on driver 150 in response to various events. The cloud-based data may include indications of specific events that cause predictable increases in mental loading across a range of other drivers. For example, and without limitation, NCS 100 could acquire cloud-based data indicating that a particular stretch of highway includes a sequence of distracting billboards, and then anticipate that the mental load on driver 150 when driving along that stretch of highway will also increase.

In yet another embodiment, NCS 100 coordinates the delivery of notifications to passengers within vehicle 140 using a different approach than that used to deliver notifications to driver 150. For example, and without limitation, NCS 100 could determine that passenger 160 is sufficiently far away from driver 150 that a mobile device in the possession of passenger 160 should be allowed to deliver notifications to passenger 160 without restrictions. In another example, NCS 100 could determine that a backseat infotainment system cannot be seen by driver 150, and therefore should not be restricted from issuing optical notifications. NCS 100 may also deliver notifications according to specific sound zones within vehicle 140. For example, and without limitation, NCS 100 could cause notifications to be output within sound zones that are inaudible to driver 150, thereby allowing notifications to be delivered to vehicle passengers without distracting driver 150.

Coordination of Exemplary Notifications

Figure 7A:
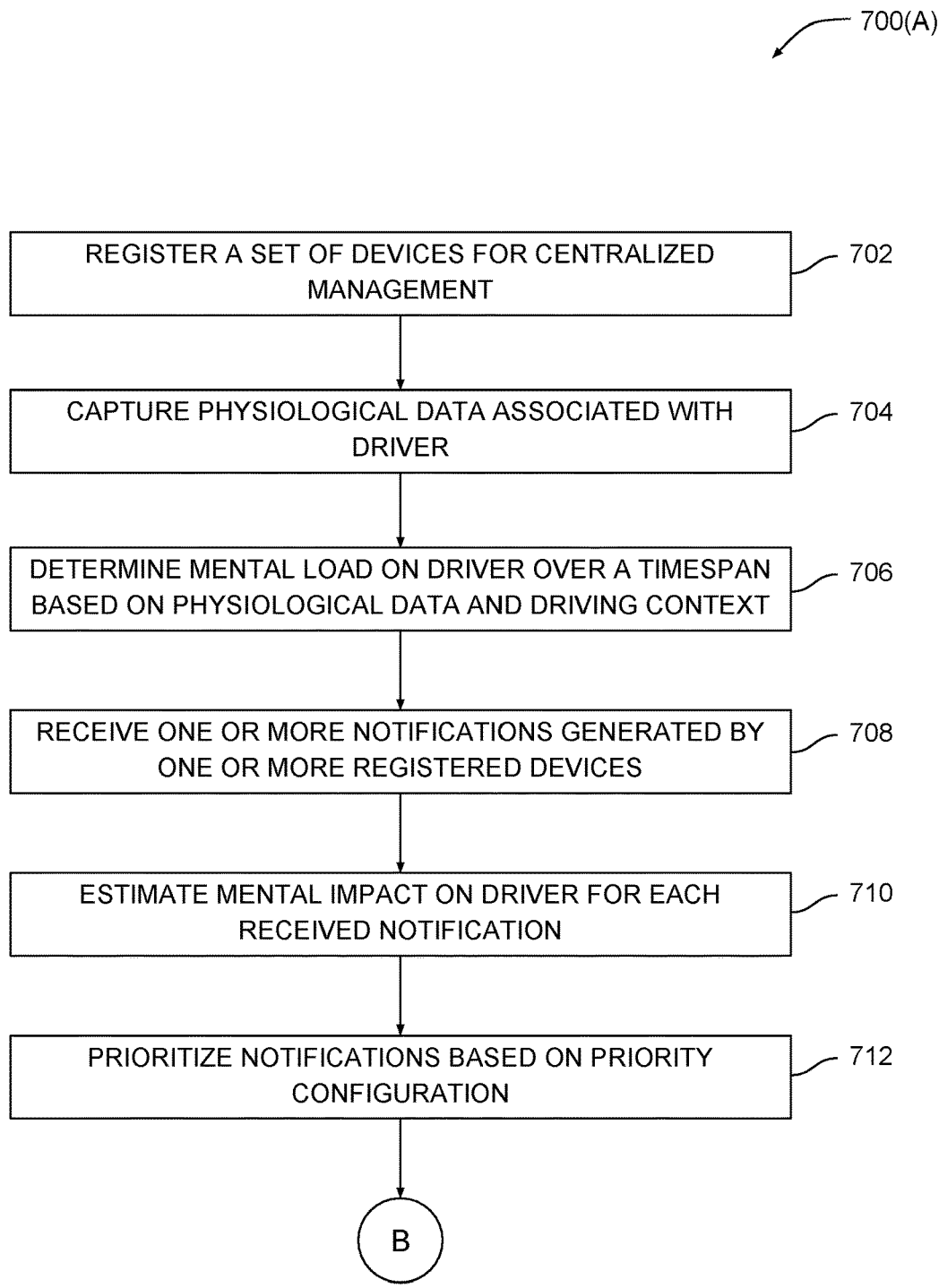
FIGS. 7A-7B set forth a flow diagram of method steps for coordinating delivery of multiple notifications to the driver of a vehicle, according to various embodiments.
Figure 7B:
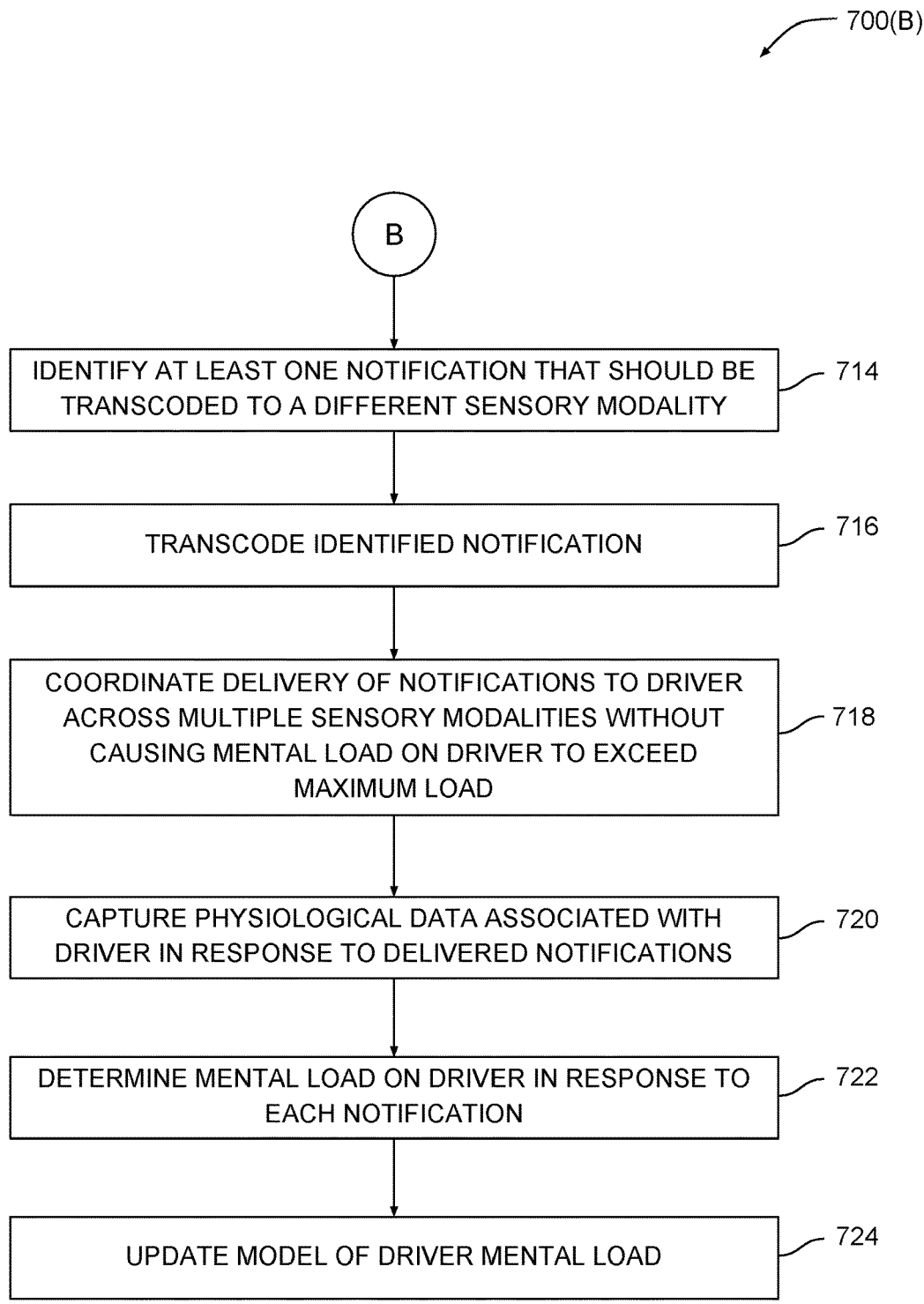

FIGS. 7A-7B set forth a flow diagram of method steps for coordinating delivery of multiple notifications to the driver of a vehicle, according to various embodiments. Although the method steps are described in conjunction with the systems of FIGS. 1-6, persons skilled in the art will understand that the method steps can be performed in any order by any system.

As shown, a method 700 begins at step 702, where NCS 100 registers a set of devices for centralized management. The set of devices generally includes interactive devices that can generate notifications of various types. At step 704, NCS 100 captures physiological data associated with driver 150. At step 706, NCS 100 determines the mental load on driver over a timespan based on the physiological data and current driving context. NCS 100 may implement a cognitive model and/or an emotional model in order to estimate the cognitive and/or emotional load on driver 150 at any given time. NCS 100 may also model the predicted cognitive and/or emotional load on driver 150 in response to future events, such as anticipated traffic, predicted weather, and so forth.

At step 708, driver 150 receives one or more notifications generated by one or more registered devices. At step 710, NCS 100 estimates the mental impact on driver for each received notification. In doing so, NCS 100 may test each notification against a cognitive and/or emotional model of driver 150. At step 712, NCS 100 prioritizes notifications based on a priority configuration. The priority configuration may indicate weights associated with different sources of notifications, or priorities associated with specific types of content, among other things. At step 714, NCS 100 identifies at least one notification that should be transcoded to a different sensory modality. The identified notification could be, for example and without limitation, a high priority notification that cannot be delivered to driver 150 in an original form because driver 150 is already engaged with a driving task. At step 716, NCS 100 transcodes the identified notification into another sensory modality where driver 150 can spare cognitive and/or emotional resources. At step 718, NCS 100 coordinates the delivery of notifications to driver

150 across multiple sensory modalities without causing mental load on driver to exceed a maximum load.

At step 720, NCS 100 captures physiological data associated with driver 150 in response to the delivered notifications. At step 722, NCS 100 determines the mental load on driver in response to each notification. Finally, at step 724, NCS 100 updates the cognitive and/or emotional model of driver 150 based on the estimated mental impact computed at step 710. In this manner, NCS 100 continuously improves the accuracy with which the cognitive and/or emotional impact of driver 150 can be predicted.

In sum, a notification control system (NCS) is configured to coordinate the delivery of notifications issued from a set of devices to the driver of a vehicle. The NCS registers all interactive devices residing in a vehicle and causes those devices to conform to specific directives generated by the NCS. The NCS analyzes and predicts the cognitive and/or emotional load on the driver and also estimates the cognitive and/or emotional impact on the driver that may be caused by any incoming notifications. The NCS then coordinates the delivery of notifications to the driver in a manner that avoids overwhelming the cognitive and/or emotional capacity of the driver. The NCS may suppress notifications, delay the delivery of notifications, and/or transcode notifications into other media associated with different sensory modalities. The NCS performs these operations in real-time based on the cognitive and/or emotional state of the driver and/or based on the current and predicted driving context.

One advantage of the approach described above is that the driver of the vehicle may maintain sufficient cognitive and mental resources to safely operate the vehicle. Because the NCS coordinates the delivery of notifications based upon the state of the driver and also the driving context, the NCS avoids situations where device notifications cause the driver to unsafely divert attention away from driving. Accordingly, the techniques described herein represent a technological advancement over conventional systems that do not coordinate the delivery of notifications.

1. Some embodiments include a computer-implemented method for transmitting notifications to a driver of a vehicle, the method comprising determining a first mental load on the driver based on sensor data, determining a second mental load on the driver associated with a first notification, determining, based on the first mental load and the second mental load, that a mental load threshold will be exceeded, modifying at least one characteristic of the first notification to generate a modified notification, and transmitting the modified notification to one or more output devices, wherein the one or more output devices output the modified notification within the vehicle.

2. The computer-implemented method of clause 1, wherein the modified notification causes a third mental load on the driver that does not exceed the mental load threshold.

3. The computer-implemented method of any of clauses 1 and 2, further comprising determining a first cognitive load on the driver based on the sensor data, determining a first emotional load on the driver based on the sensor data, and determining the first mental load based on the first cognitive load and the first emotional load.

4. The computer-implemented method of any of clauses 1, 2, and 3, wherein the first mental load comprises a cognitive load on the driver, and wherein the sensor data comprises at least one of pupillometry data, heart rate data, breathing rate data, and eye gaze data.

5. The computer-implemented method of any of clauses 1, 2, 3, and 4, wherein the first mental load comprises an emotional load on the driver, and wherein the sensor data comprises at least one of facial expression data, voice tone data, and galvanic skin response data.

6. The computer-implemented method of any of clauses 1, 2, 3, 4, and 5, wherein the first mental load corresponds to a portion of a first time span, and the second mental load corresponds to another portion of the first time span and is associated with the first notification.

7. The computer-implemented method of any of clauses 1, 2, 3, 4, 5, and 6, wherein the at least one characteristic of the first notification comprises a transmission time associated with the first notification, and wherein modifying the at least one characteristic comprises delaying the transmission time to occur after a first time span that corresponds to the first mental load.

8. The computer-implemented method of any of clauses 1, 2, 3, 4, 5, 6, and 7, wherein the at least one characteristic of the first notification comprises a first encoding medium of first content included in the first notification, wherein modifying the at least one characteristic comprises transcoding the first content from the first encoding medium to a second encoding medium, and wherein the modified notification is transmitted within a first time span that corresponds to the first mental load.

9. The computer-implemented method of any of clauses 1, 2, 3, 4, 5, 6, 7, and 8, wherein the first encoding medium comprises a visual medium and the second encoding medium comprises an auditory medium.

10. Some embodiments include a non-transitory computer-readable medium storing program instructions that, when executed by a processor, cause the processor to transmit notifications to a driver of a vehicle by performing the steps of determining a first mental load on the driver based on sensor data, determining a second mental load on the driver associated with a first notification, determining, based on the first mental load and the second mental load, that a mental load threshold will be exceeded, determining a priority level associated with the first notification, and transmitting, based on the priority level, either the first notification or a modified version of the first notification to one or more output devices to be output within the vehicle, thereby causing a third mental load on the driver that does not exceed the maximum load threshold.

11. The non-transitory computer-readable medium of clause 10, wherein the step of determining the second mental load comprises identifying content included in the first notification, and inputting the content to a machine learning model, wherein the machine learning model predicts physiologic responses of the driver to stimuli.

12. The non-transitory computer-readable medium of any of clauses 10 and 11, further comprising training the machine learning model based on a previous response of the driver to a previous notification and based on content included in the previous notification.

13. The non-transitory computer-readable medium of any of clauses 10, 11, and 12, wherein the first notification is generated by a device integrated into the vehicle.

14. The non-transitory computer-readable medium of any of clauses 10, 11, 12, and 13, wherein the first notification is generated by a portable device or wearable device associated with the driver.

15. The non-transitory computer-readable medium of any of clauses 10, 11, 12, 13, and 14, wherein the first notification is generated by a portable device associated with a passenger of the vehicle, and further comprising transmitting the first notification to the portable device associated with the passenger.

16. The non-transitory computer-readable medium of any of clauses 10, 11, 12, 13, 14, and 15, wherein the first notification is generated by a portable device associated with a passenger of the vehicle, and further comprising outputting the first notification within a sound field associated with the passenger, wherein the sound field excludes the driver.

17. The non-transitory computer-readable medium of any of clauses 10, 11, 12, 13, 14, 15, and 16, further comprising registering a set of devices that generate notifications with a centralized controller that schedules the notifications to be output to the driver, wherein a first device included in the set of devices generates the first notification.

18. The non-transitory computer-readable medium of any of clauses 10, 11, 12, 13, 14, 15, 16, and 17, further comprising determining a transmission time associated with the first notification based on the priority level.

19. Some embodiments include a system, comprising a sensor array that captures physiologic data associated with the driver of a vehicle, a memory storing a software application, and a processor that, when executing the software application, is configured to perform the steps of determining a first mental load on the driver based on the sensor data, determining a second mental load on the driver associated with a first notification, determining, based on the first mental load and the second mental load, that a mental load threshold will be exceeded, modifying at least one characteristic of the first notification to generate a modified notification, and transmitting the modified notification to one or more output devices, wherein the one or more output devices output the modified notification within the vehicle, and the modified notification causes a third mental load on the driver that does not exceed the maximum load threshold.

20. The system of clause 19, wherein the first mental load is determined based on a first portion of the sensor data corresponding to a first physical attribute of the driver and a second portion of the sensor data corresponding to a second physical attribute of the driver.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transmitting notifications to a driver of a vehicle, the method comprising:
   determining a first mental load on the driver based on sensor data;

determining a second mental load on the driver, wherein the second mental load comprises a predicted mental load impact on the driver attributable to a first notification;

determining, based on the first mental load and the second mental load, that a mental load threshold will be exceeded; and in response to determining that the mental load threshold will be exceeded:

changing a sensory modality of the first notification to generate a modified notification having a second predicted mental load impact on the driver lower than the predicted mental load impact on the driver attributable to the first notification; and transmitting the modified notification to one or more output devices, wherein the one or more output devices output the modified notification within the vehicle.

2. The computer-implemented method of claim 1, wherein the modified notification causes a third mental load on the driver that does not exceed the mental load threshold.

3. The computer-implemented method of claim 1, further comprising:

determining a first cognitive load on the driver based on the sensor data;

determining a first emotional load on the driver based on the sensor data; and determining the first mental load based on the first cognitive load and the first emotional load.

4. The computer-implemented method of claim 1, wherein the first mental load comprises a cognitive load on the driver, and wherein the sensor data comprises at least one of pupillometry data, heart rate data, breathing rate data, or eye gaze data.

5. The computer-implemented method of claim 1, wherein the first mental load comprises an emotional load on the driver, and wherein the sensor data comprises at least one of facial expression data, voice tone data, or galvanic skin response data.

6. The computer-implemented method of claim 1, wherein the first mental load corresponds to a portion of a first time span, and the second mental load corresponds to another portion of the first time span and is associated with the first notification.

7. The computer-implemented method of claim 1, further comprising delaying, in response to determining that the mental load threshold will be exceeded, a transmission time of the modified notification until after a first time span that corresponds to the first mental load.

8. The computer-implemented method of claim 1, wherein the sensory modality of the first notification comprises a first encoding medium of first content included in the first notification, wherein changing the sensory modality comprises transcoding the first content from the first encoding medium to a second encoding medium, and wherein the modified notification is transmitted within a first time span that corresponds to the first mental load.

9. The computer-implemented method of claim 8, wherein the first encoding medium comprises a visual medium and the second encoding medium comprises an auditory medium.

10. A non-transitory computer-readable medium storing program instructions that, when executed by a processor, cause the processor to transmit notifications to a driver of a vehicle by performing the steps of:

determining a first mental load on the driver based on sensor data;

determining a second mental load on the driver, wherein the second mental load comprises a predicted mental load impact on the driver attributable to a first notification;

determining, based on the first mental load and the second mental load, that a mental load threshold will be exceeded;

determining a priority level associated with the first notification; and in response to determining that the mental load threshold will be exceeded:

changing a sensory modality of the first notification to generate a modified notification having a second predicted mental load impact on the driver lower than the predicted mental load impact on the driver attributable to the first notification; and transmitting, based on the priority level, either the first notification or a modified version of the first notification to one or more output devices to be output within the vehicle, thereby causing a third mental load on the driver that does not exceed the mental load threshold.

11. The non-transitory computer-readable medium of claim 10, wherein the step of determining the second mental load comprises:

identifying content included in the first notification; and inputting the content to a machine learning model, wherein the machine learning model predicts physiologic responses of the driver to stimuli.

12. The non-transitory computer-readable medium of claim 11, further comprising training the machine learning model based on a previous response of the driver to a previous notification and based on content included in the previous notification.

13. The non-transitory computer-readable medium of claim 11, wherein the first notification is generated by a device integrated into the vehicle.

14. The non-transitory computer-readable medium of claim 11, wherein the first notification is generated by a portable device or wearable device associated with the driver.

15. The non-transitory computer-readable medium of claim 11, wherein the first notification is generated by a portable device associated with a passenger of the vehicle, and further comprising transmitting the first notification to the portable device associated with the passenger.

16. The non-transitory computer-readable medium of claim 11, wherein the first notification is generated by a portable device associated with a passenger of the vehicle, and further comprising outputting the first notification within a sound field associated with the passenger, wherein the sound field excludes the driver.

17. The non-transitory computer-readable medium of claim 11, further comprising registering a set of devices that generate notifications with a centralized controller that schedules the notifications to be output to the driver, wherein a first device included in the set of devices generates the first notification.

18. The non-transitory computer-readable medium of claim 11, further comprising determining a transmission time associated with the first notification based on the priority level.

19. A system, comprising:

a sensor array that captures physiologic data associated with a driver of a vehicle;

a memory storing a software application; and a processor that, when executing the software application, is configured to perform the steps of:
- determining a first mental load on the driver based on sensor data,
- determining a second mental load on the driver, wherein the second mental load comprises a predicted mental load impact on the driver attributable to a first notification,
- determining, based on the first mental load and the second mental load, that a mental load threshold will be exceeded, and
- in response to determining that the mental load threshold will be exceeded:
  - changing a sensory modality of the first notification to generate a modified notification having a second predicted mental load impact on the driver lower than the predicted mental load impact on the driver attributable to the first notification, and
  - transmitting the modified notification to one or more output devices, wherein the one or more output devices output the modified notification within the vehicle, and the modified notification causes a third mental load on the driver that does not exceed the mental load threshold.

20. The system of claim 19, wherein the first mental load is determined based on a first portion of the sensor data corresponding to a first physical attribute of the driver and a second portion of the sensor data corresponding to a second physical attribute of the driver.

\* \* \* \* \*